APPARATUS FOR MECHANICALLY PARKING AND STORING AUTOMOBILES

Filed June 27, 1955 11 Sheets-Sheet 1

INVENTOR:
NEAL W. DENSMORE

BY [signature]

ATTORNEY

APPARATUS FOR MECHANICALLY PARKING AND STORING AUTOMOBILES

Filed June 27, 1955 11 Sheets-Sheet 2

INVENTOR:
NEAL W. DENSMORE
BY Charles F. Osgood
ATTORNEY

Aug. 26, 1958 N. W. DENSMORE 2,849,127

APPARATUS FOR MECHANICALLY PARKING AND STORING AUTOMOBILES

Filed June 27, 1955 11 Sheets-Sheet 3

INVENTOR:
NEAL W. DENSMORE

BY Charles F. Osgood,

ATTORNEY

Aug. 26, 1958 N. W. DENSMORE 2,849,127

APPARATUS FOR MECHANICALLY PARKING AND STORING AUTOMOBILES

Filed June 27, 1955 11 Sheets-Sheet 4

INVENTOR:
NEAL W. DENSMORE

BY Charles F. Osgood.

ATTORNEY

APPARATUS FOR MECHANICALLY PARKING AND STORING AUTOMOBILES

Filed June 27, 1955 11 Sheets-Sheet 5

INVENTOR:
NEAL W. DENSMORE
BY Charles F. Osgood,
ATTORNEY

APPARATUS FOR MECHANICALLY PARKING AND STORING AUTOMOBILES

Filed June 27, 1955

INVENTOR:
NEAL W. DENSMORE
BY Charles F. Osgood,
ATTORNEY

INVENTOR:
NEAL W. DENSMORE
BY Charles F. Osgood,
ATTORNEY

Aug. 26, 1958 N. W. DENSMORE 2,849,127

APPARATUS FOR MECHANICALLY PARKING AND STORING AUTOMOBILES

Filed June 27, 1955 11 Sheets-Sheet 8

INVENTOR:
NEAL W. DENSMORE

BY Charles F. Osgood

ATTORNEY

APPARATUS FOR MECHANICALLY PARKING AND STORING AUTOMOBILES

Filed June 27, 1955 11 Sheets-Sheet 9

INVENTOR:
NEAL W. DENSMORE
BY Charles F. Ozard
ATTORNEY

Aug. 26, 1958 N. W. DENSMORE 2,849,127

APPARATUS FOR MECHANICALLY PARKING AND STORING AUTOMOBILES

Filed June 27, 1955 11 Sheets-Sheet 10

INVENTOR:
NEAL W. DENSMORE

BY Charles F. Osgood,

ATTORNEY

Aug. 26, 1958 N. W. DENSMORE 2,849,127

APPARATUS FOR MECHANICALLY PARKING AND STORING AUTOMOBILES

Filed June 27, 1955 11 Sheets-Sheet 11

INVENTOR:
NEAL W. DENSMORE

BY Charles F. Osgood,

ATTORNEY

United States Patent Office 2,849,127

Patented Aug. 26, 1958

2,849,127

APPARATUS FOR MECHANICALLY PARKING AND STORING AUTOMOBILES

Neal W. Densmore, Franklin, Pa., assignor to Joy Manufacturing Company, Pittsburgh, Pa., a corporation of Pennsylvania Application June 27, 1955, Serial No. 518,090

12 Claims. (Cl. 214—16.1)

This invention relates to vehicle parking and storing apparatus and more particularly to a mechanical parking and storing apparatus for automobiles and embodying a series of superimposed rotatable automobile supports mounted to turn independently about a common vertical axis on a supporting column and elevator means associated with the column whereby an automobile may be moved toward and from any of the superimposed supporting positions on the column without need for operating the automobile under its own power during parking and avoiding the necessity for lateral repositioning of the elevator means.

In conventional automobile parking machines wherein automobiles are mechanically parked and stored at different levels, the elevating means for moving the automobiles toward and from the different levels must usually be laterally repositioned not only in a time-consuming manner but also resulting in a relatively complicated mechanism. Ofttimes, the elevator of known types of machines is located centrally of the parking and storing apparatus on which the automobiles are stored in relatively stationary superimposed compartments or stalls disposed radially of the vertical axial line of the apparatus, thereby requiring not only frequent lateral repositioning of the elevator and repositioning of the automobiles during parking but also, due to permanent disposition of the apparatus on its base, precluding ready disassembly for transportation to other locations. In other known instances, the parking platforms of the machines are carried by a continuous elevator and conveying system so that frequent repositioning of the parked and stored automobiles is necessitated by the addition or removal of automobiles to or from the apparatus resulting, likewise, in a relatively complicated structure which is both costly and relatively time-consuming in operation. The present invention contemplates improvements over known types of mechanical automobile parking and storing apparatus in that the structure is relatively simple in design requiring a minimum of supervision and reducing frequent shifting of the parked and stored automobiles with respect to the elevator means and making lateral repositioning of the elevator unnecessary. Further, with the apparatus of the present invention any need for operating the automobile toward and from its parked and stored position on the apparatus is eliminated so that the automobile may be completely locked up when it is stored.

An object of the present invention is to provide an improved mechanical automobile parking and storing apparatus. Another object is to provide an improved automobile parking and storing apparatus wherein the parked automobiles are always conveniently accessible and may be parked on or removed from the apparatus without repositioning of the automobiles to different levels and frequent lateral repositioning of the associated elevator means. Yet another object is to provide an improved mechanical parking and storing apparatus whereby a maximum number of vehicles may be accommodated in a minimum space without sacrificing accessibility of the vehicles. A further object is to provide an improved parking and storing apparatus whereby the vehicles may be conveniently elevated to different levels and may be distributed with respect to the elevating means in such manner that all vehicles have clear access to the elevator without undue shifting of the vehicles to different levels. A still further object is to provide an improved automobile parking and storing apparatus wherein the automobiles may be moved into and from parked and stored positions without need for the automobile to be driven under its own power during parking, thereby enabling the automobile to be driven to and from the apparatus only by the one in authority and with the automobile left ready to be parked with the brakes set and with the automobile completely closed up and locked. Still another object is to provide an improved mechanical parking and storing apparatus for automobiles which permits parking of the automobiles in a relatively restricted space at different levels and in different lateral positions without need for utilizing the power of the automobile to effect transition thereof to and from parked position on the apparatus. These and other objects and advantages of the invention will, however, hereinafter more fully appear in the course of the ensuing description.

In the accompanying drawings there is shown for purposes of illustration one form which the invention may assume in practice.

Figure 1:
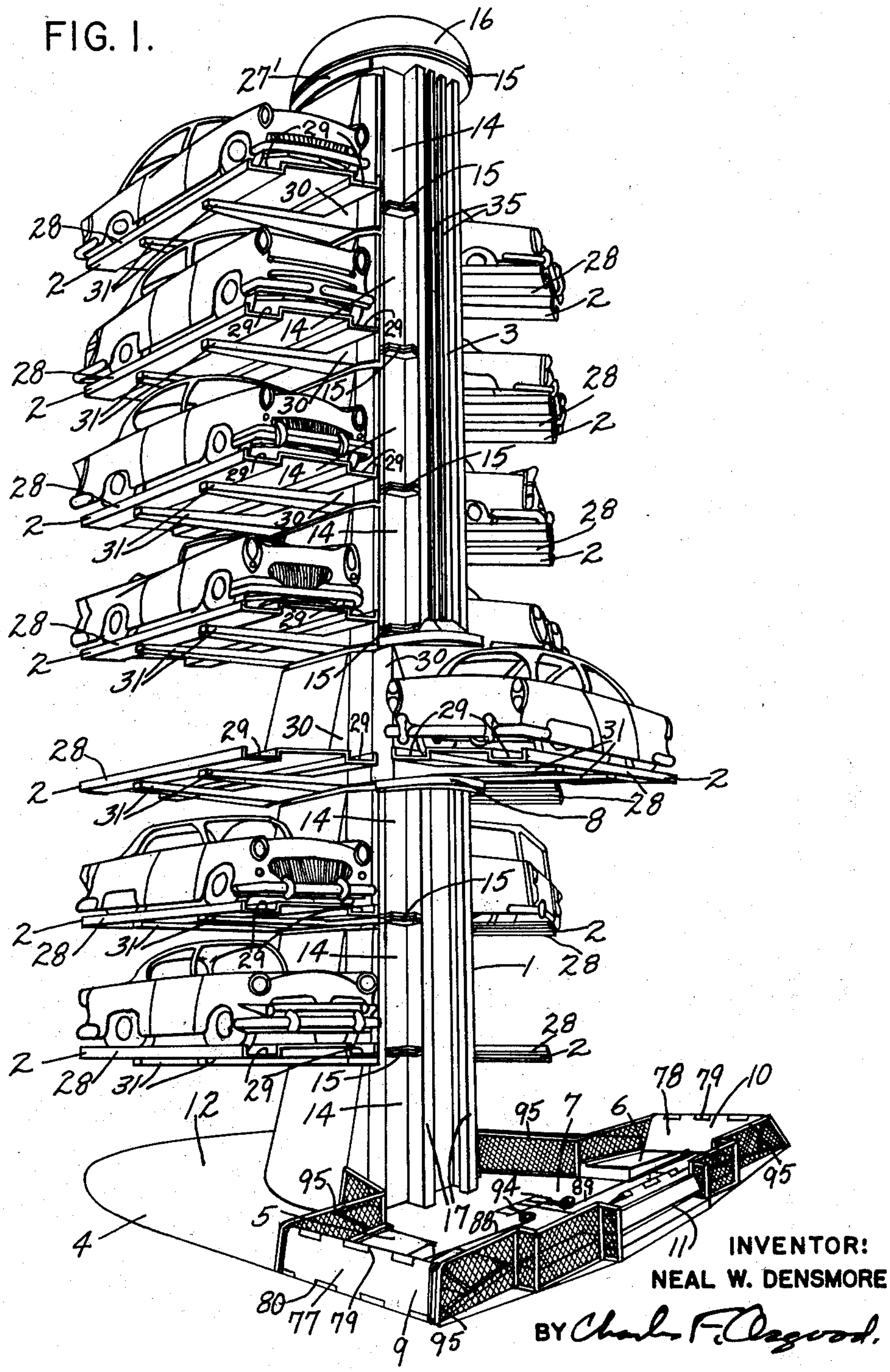
Figs. 1 and 2 are perspective views in side elevation, viewed from different angles and showing the improved parking and storing apparatus and the associated entrance and exit gates.
Figure 2:
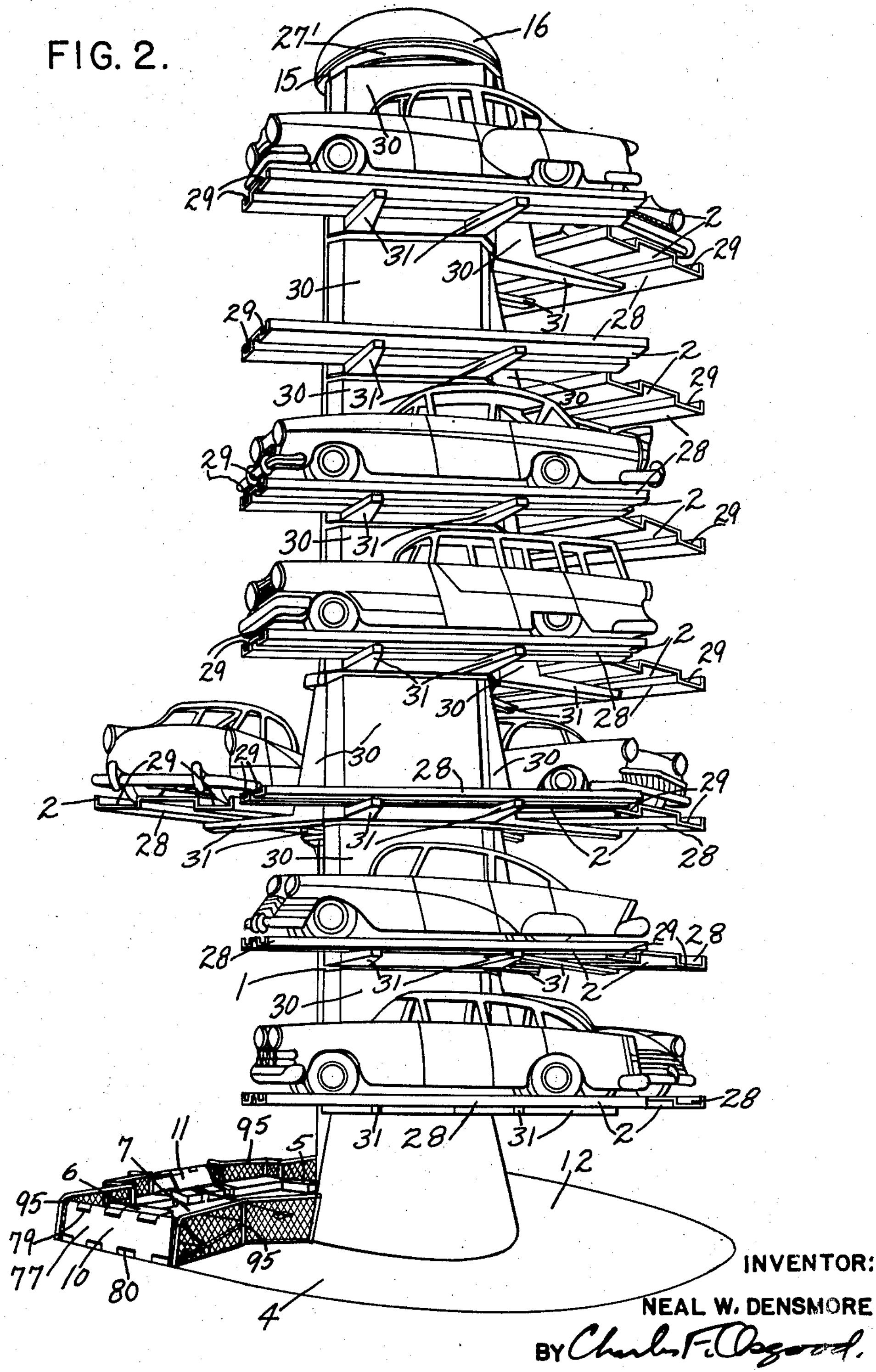

The automobile parking and storing apparatus, as shown in Figs. 1 and 2, generally comprises a vertical supporting column, mastlike structure or towerlike pedestal 1 on which a series of superimposed automobile-receiving supports or platforms 2 are rotatably mounted, and extending vertically alongside the column or pedestal is an elevator mechanism 3. The column or pedestal has a widely extended base 4 and located at one side of the base are oppositely inclined surfaces 5 and 6 extending upwardly relative to a horizontal surface 7 over which a platform on an elevator frame 8 may be disposed in lowered position to receive or discharge an automobile. The apparatus has entrance and exit gates or gate devices 9 and 10, while an intermediate gate or gate device 11 serves to provide for entry and exit of the operator or passengers of the automobile on the lowered elevator platform. The column or pedestal base desirably has a wide unobstructed upper surface 12 beneath the lowermost revoluble supporting platforms and, if desired, automobiles may be parked on this surface beneath the lower platform, or the base surface may be used for other purposes, such as to receive vendors' stands, display cases or other desired articles or equipment. The column or pedestal base is desirably mounted on a concrete foundation 13 and may be suitably weighted to hold it firmly in place on its foundation. If desired, the base may be of a fabricated welded steel plate construction divided into tanklike compartments (Fig. 8) to receive a substance such as water, to increase its weight.

Figure 13:
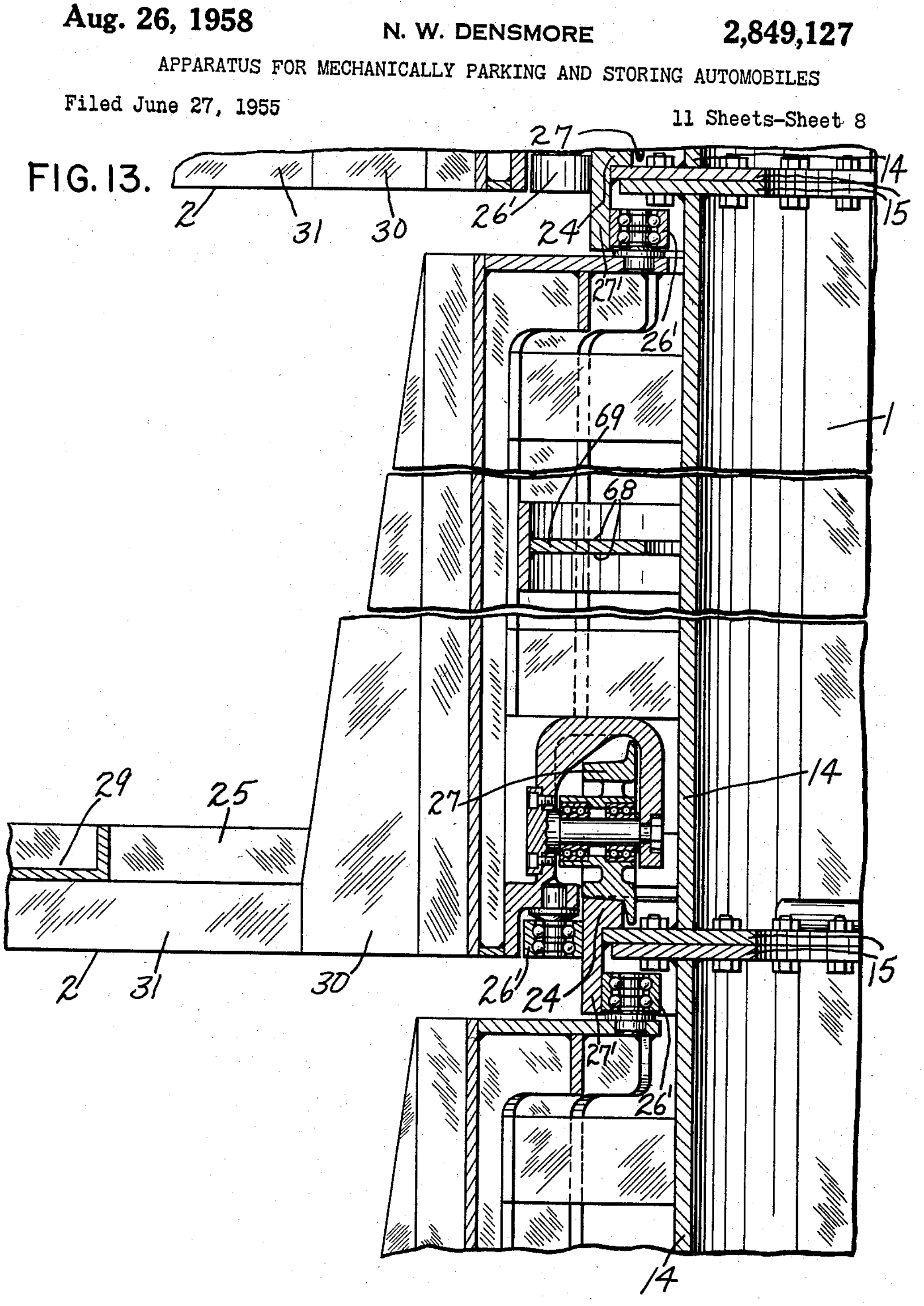
Fig. 13 is an enlarged fragmentary vertical section taken on line 13—13 of Fig. 12.
Figures 20, 21, 22, 23:
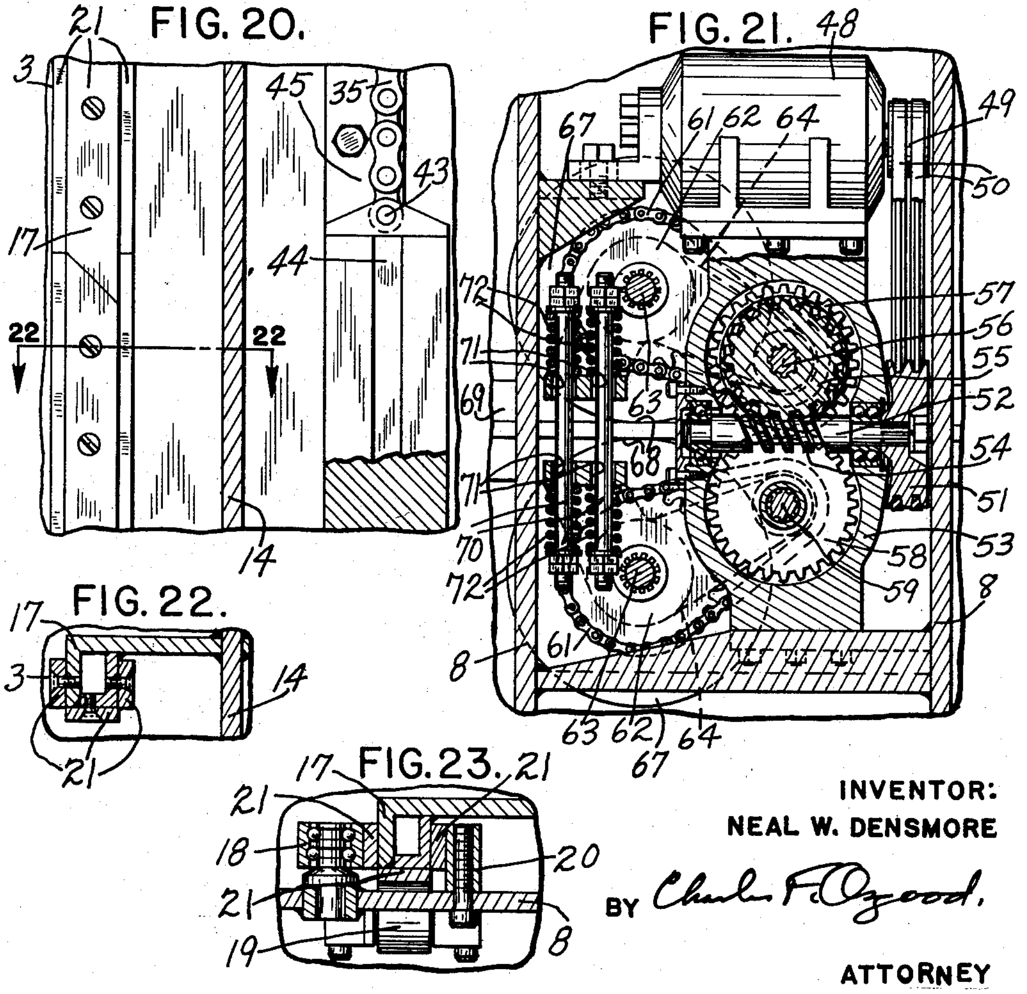
Fig. 20 is an enlarged detail vertical section taken on line 20—20 of Fig. 4, showing the counterweight.
Fig. 21 is a detail vertical section taken on line 21—21 of Fig. 16.
Fig. 22 is a detail horizontal section taken on line 22—22 of Fig. 20.
Fig. 23 is a detail horizontal section taken on line 23—23 of Fig. 16.

The supporting column or mast is desirably of a fabricated reinforced welded metal construction comprising a series of separate superimposed sections 14 (Figs. 4 and 13) flanged at 15 for bolting together in superimposed relation on the base, and the top section has a detachable dome or domelike cover 16. Extending vertically along one side of the column or pedestal are parallel guides or track rails 17 and the elevator frame 8 is guided for vertical movement along the guideway provided by these parallel guides. Rollers 18 and 19 suitably journaled on rectangularly related axes on the elevator frame ride against the outer sides and tops of the guides 17, while thrust blocks 20 slide against the inner surfaces of the guides for retaining the frame in proper guided relation with respect to the guideway. The surfaces of the guide rails against which the rolls and thrust blocks bear are provided with replaceable wear strips 21 suitably detachably held in position, as by screws (Figs. 22 and 23). The elevator frame 8 carries a horizontal arcuate track or guide rail 22 having its curvature struck on the radius extending from the vertical axial line of the column (Fig. 16) and an annular frame 23 is rotatably mounted on the elevator frame 8 to turn horizontally about the vertical axis of the column.

Figure 12:
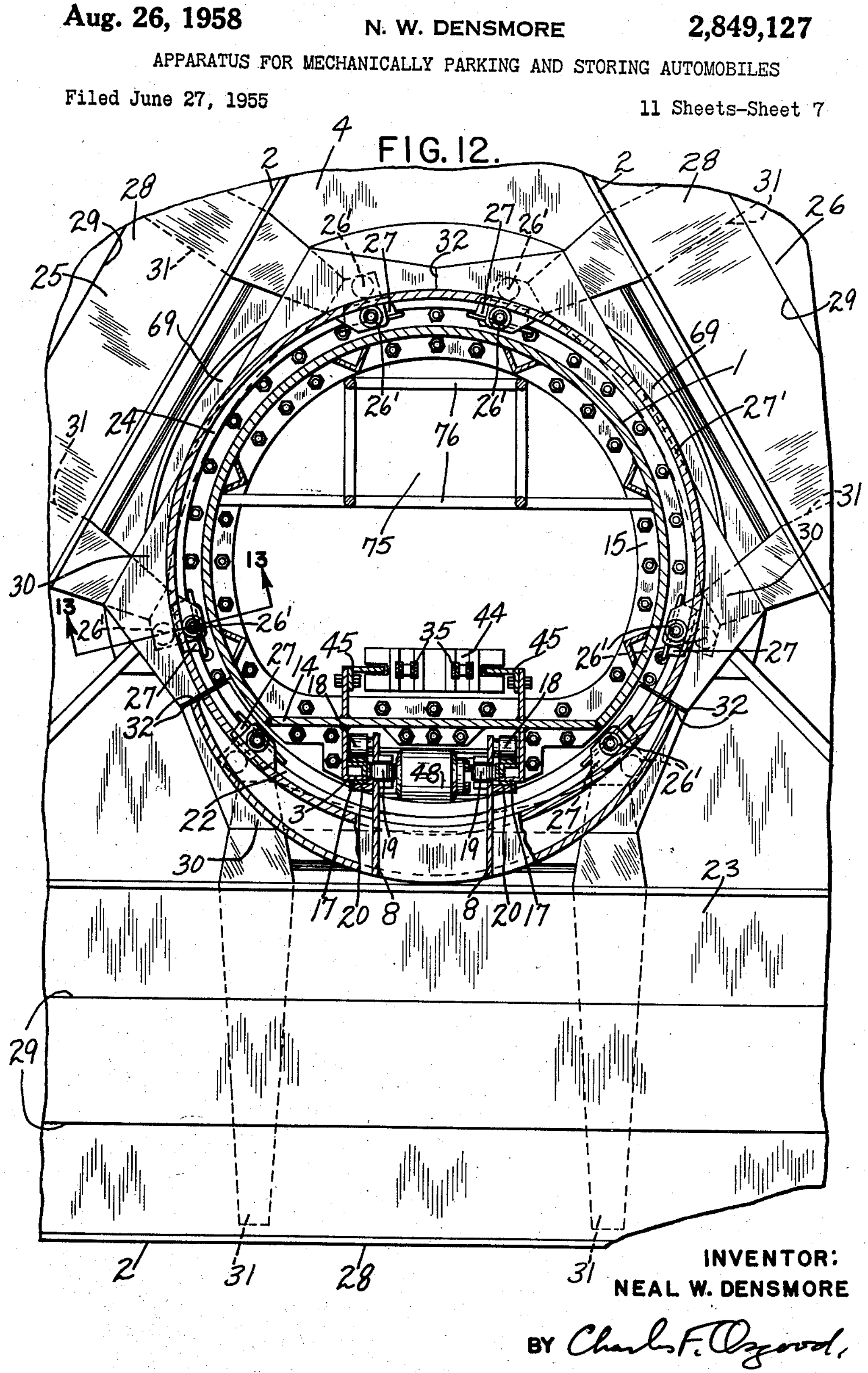
Fig. 12 is an enlarged horizontal section taken on line 12—12 of Fig. 4.
Figures 14, 15:
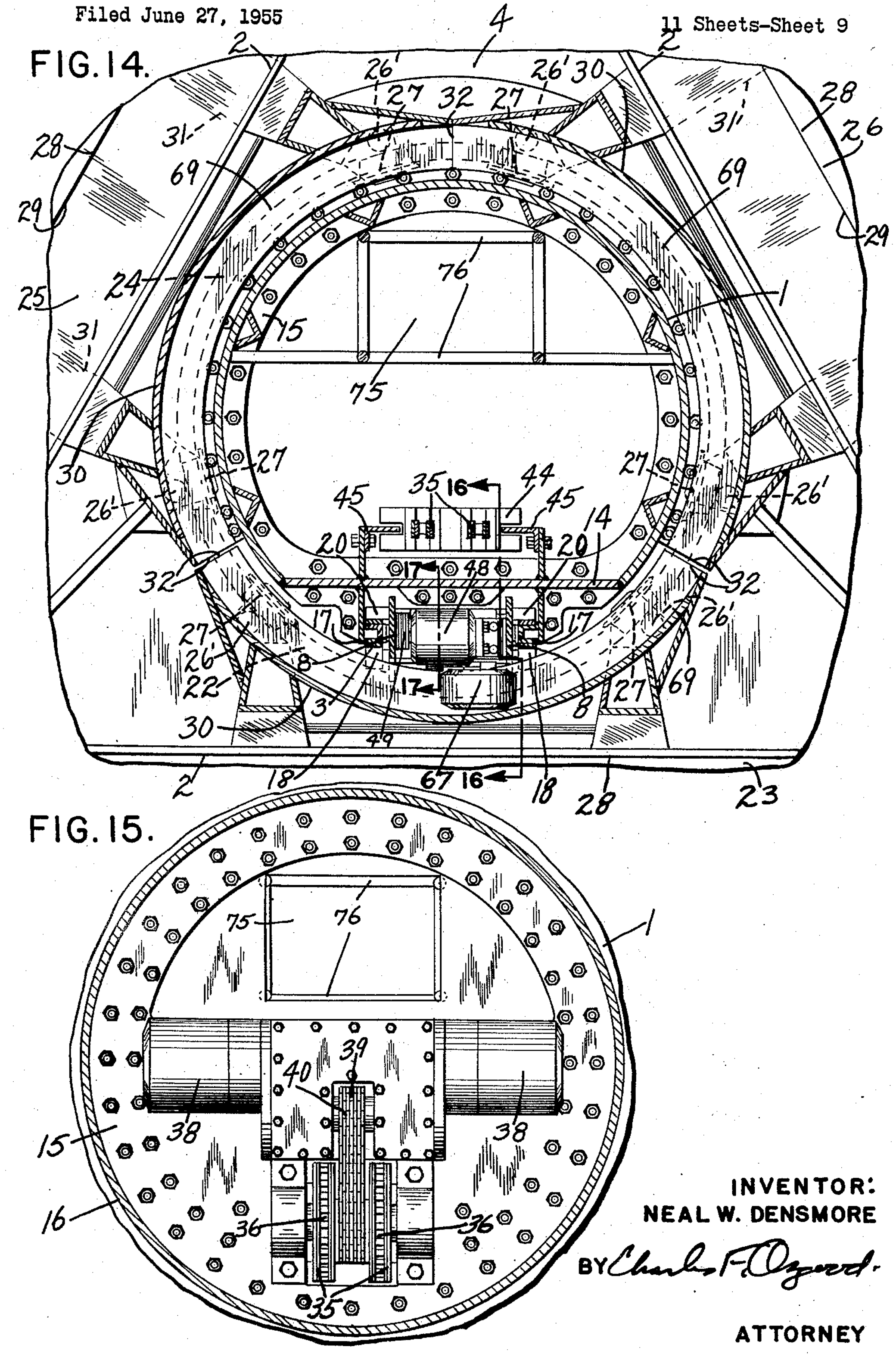
Fig. 14 is an enlarged detail horizontal section taken on line 14—14 of Fig. 4.
Fig. 15 is an enlarged detail horizontal section taken on line 15—15 of Fig. 4.

In this improved construction, each of the cylindrical frame sections 14 of the column or mast has secured to its bottom flange a curved horizontal track or track rail 24 similar to the track rail 22 of the elevator frame and the track rail 22 is adapted to cooperate with the rails 24 of each column section to provide a circular trackway. Rotatably mounted to turn horizontally on each of the column sections 14 is a pair of frames 25 and 26 similar to the rotatable frame 23 and each carrying a pair of bottom wheels 27 (Figs. 13 and 14) adapted to travel along the circular trackway. Upper and lower guide rolls 26' (Fig. 13) on the rotatable frames run along the inner and outer surfaces of curved guides 27' on the column track sections (Fig. 12). The rotatable frame 23, shown carried by the elevator frame 8, has a similar pair of wheels and all of the fourteen rotatable frames, two opposite each of the seven superimposed sections of the column, are similar in construction to the frame 23, shown carried by the elevator frame 8. Each of the rotatable frames carries a horizontal platform 28 and when the elevator frame 8 is at the level of any of the superimposed rotatable frames on the seven column sections, the rotatable frame then on the elevator may be turned along the curved track of the elevator frame onto the curved tracks of the superimposed frames on the column and as the frame on the elevator frame rolls off the latter, one of the rotatable frames is pushed along its track onto the elevator frame. Thus, there are always two of the automobile-receiving platforms on each of the superimposed column sections with one of the platforms always carried by the elevator frame so that the column may support fifteen automobile-receiving platforms. Any one of these fifteen platform-supporting frames may be received by the elevator frame and a platform-supporting frame on the elevator frame may be raised along the vertical guideway of the column into positions at any of the seven levels provided by the superimposed sections of the column. Evidently, instead of seven superimposed column sections and the fifteen automobile-receiving platforms, a smaller or larger number may be employed, if desired.

Figure 3:
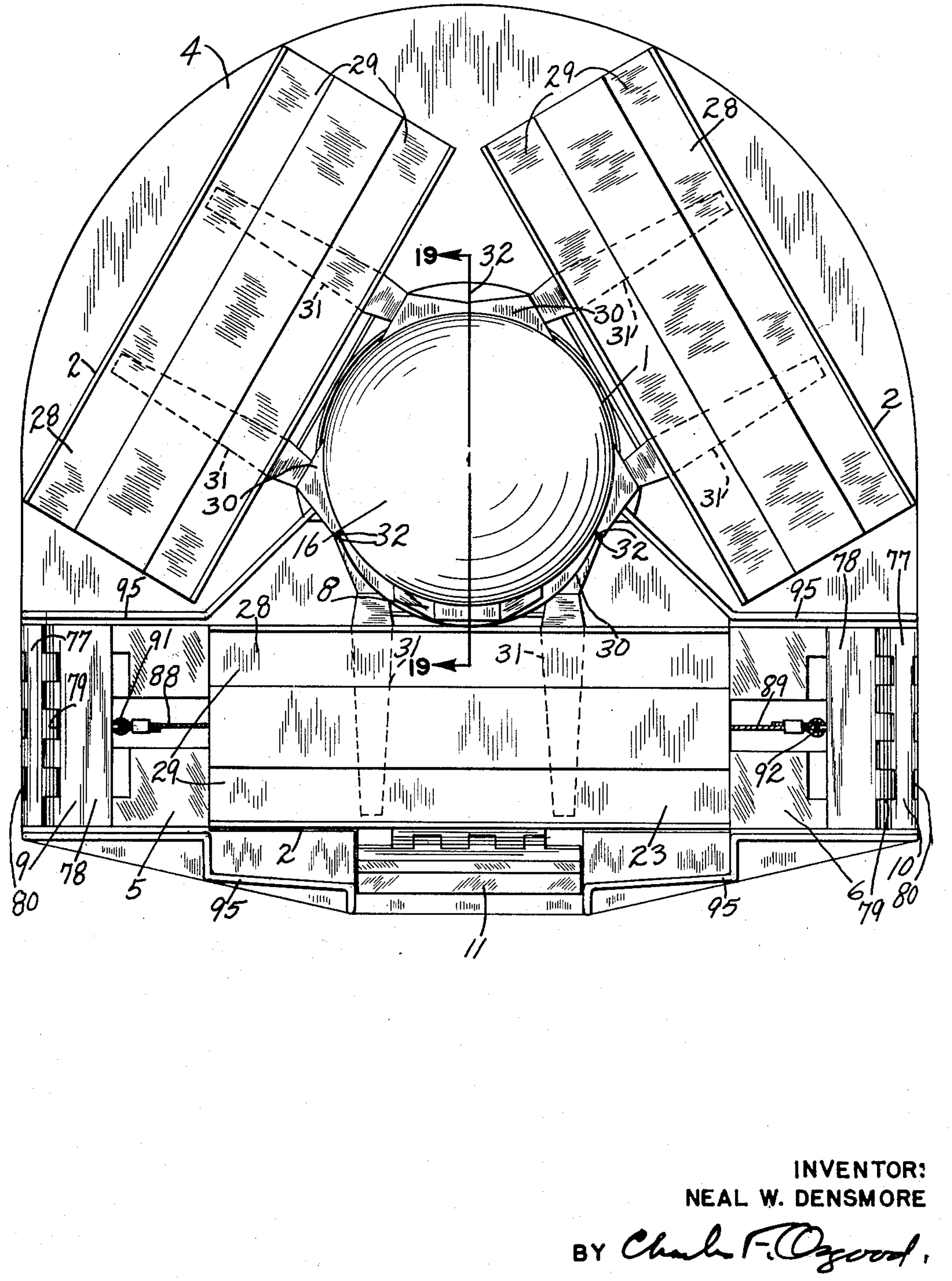
Fig. 3 is an enlarged plan view of the parking and storing apparatus shown in Figs. 1 and 2.
Figure 4:
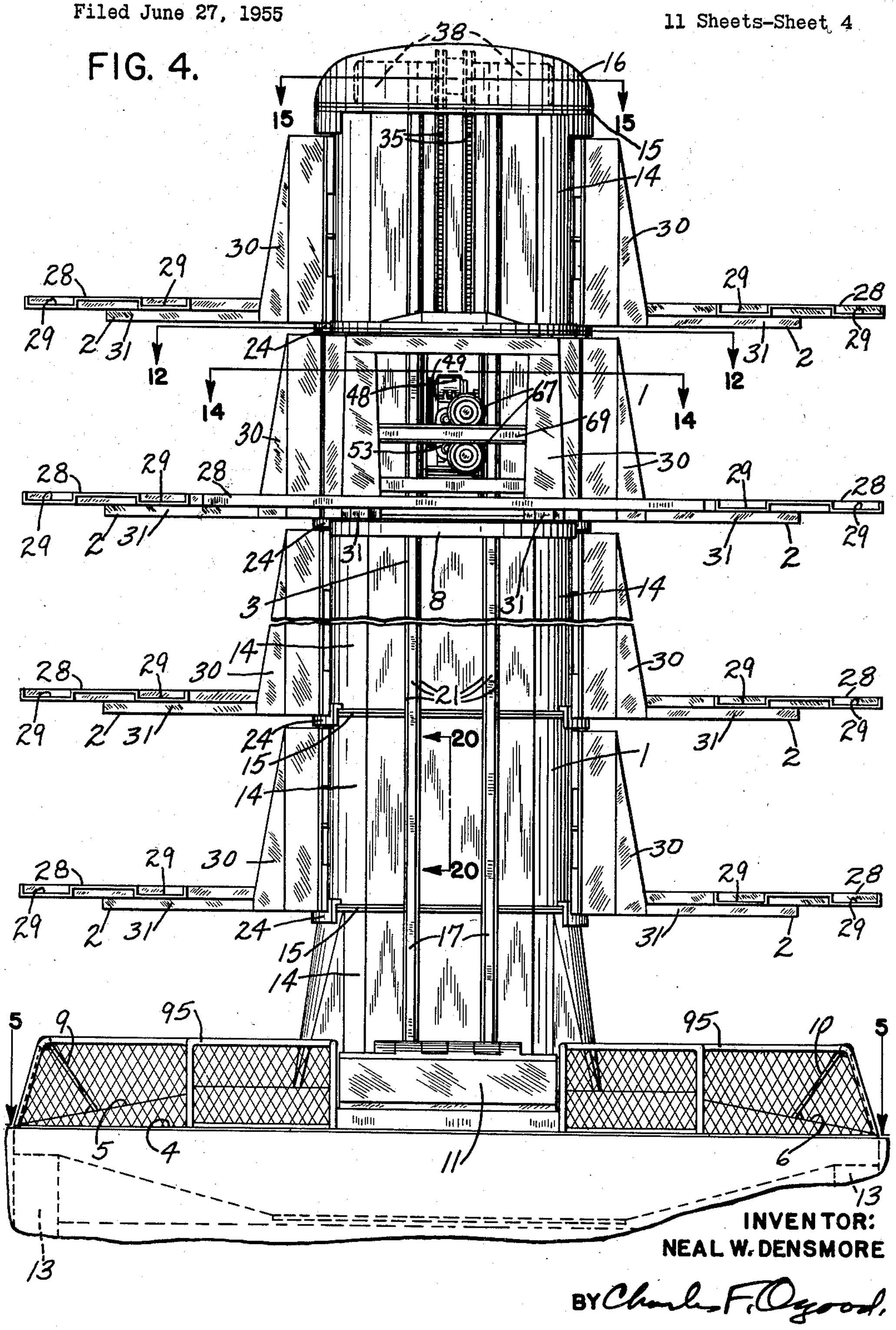
Fig. 4 is an enlarged side elevation of the parking and storing apparatus, looking toward the elevator and showing the entrance and exit gates for the automobile operator or passengers.

Each of the automobile-receiving platforms is provided with parallel horizontal troughlike trackways or supporting guides 29 along which the wheels of the automobile may travel as the latter moves onto or is discharged from a platform and when an automobile is in proper position on the platform, the wheels may be suitably automatically chocked or otherwise held against movement. As shown in Fig. 4, the rotatable platform-supporting frames have arcuate or segmental bodies 30 which support parallel armlike brackets or supporting portions 31 underlying the platforms and to which the latter are suitably rigidly secured (Figs. 3 and 12). The ends of the arcuate bodies of the rotatable frame have end-abutting surfaces 32 so that when the frame on the elevator frame 8 is turned horizontally along its track it abuts and shoves against the other frames thereby to turn the three frames together with each abutting the others. Thus, as above mentioned, as the rotatable frame on the elevator is turned sufficiently to roll off from the elevator track, another abutting frame rolls onto the elevator track and the three frames may be turned to bring any one of them into proper position on the track of the elevator with the other two frames supported by the column tracks. As stated above, the elevator frame 8 may be raised and lowered along its vertical guideway to the level of any one of the seven superimposed column frame sections so as to enable turning of the rotatable frames onto or off from the elevator frame at any one of the multiple parking levels of the column.

Figure 19:
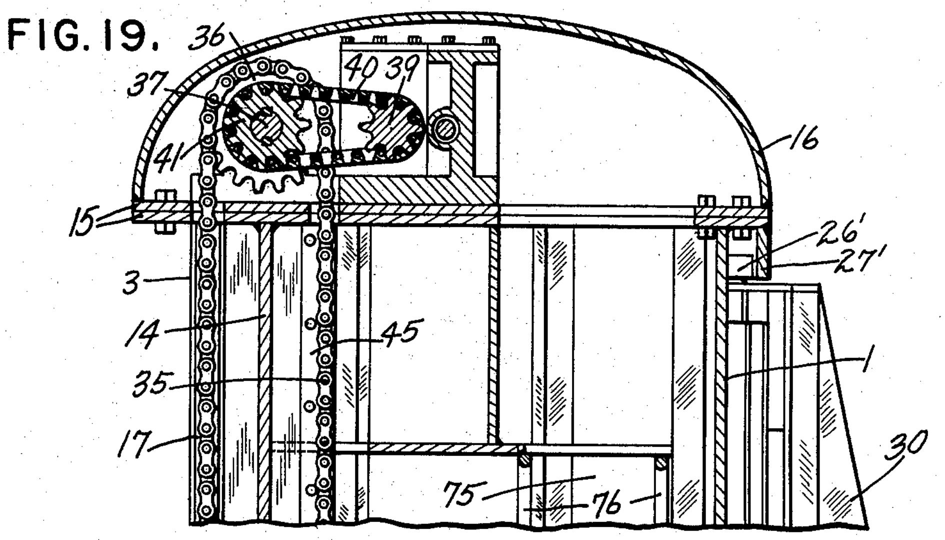
Fig. 19 is an enlarged central vertical section taken on line 19—19 of Fig. 3, showing details of the supporting column and the associated elevator mechanism.

Now referring to the motor driven mechanism for raising and lowering the elevator frame 8 along the vertical guideway of the column, it will be noted that, for illustrative purposes, there is shown a pair of parallel elevator chains 35 extending vertically between the parallel guides 17 and at their upper portions the chains pass around drive sprockets 36 mounted on a cross shaft 37 (Fig. 19) suitably journaled at the top portion of the column. Conventional reversible motors 38, operating in unison, are operatively connected to the sprockets 36 through conventional reduction gearing which drives a sprocket 39 connected by an endless drive chain 40 to a sprocket 41 keyed to the cross shaft 37 (Fig. 19). The elevating chains are attached at one end, at 42 (Fig. 16), to the elevator frame 8 and the chains at their other ends are attached, at 43 (Fig. 20), to a counterweight 44 guided for vertical movement along parallel upright guides 45 of a vertical guideway within the column. Thus, by operating the motors the elevator frame and the receiving platform thereon may be moved upwardly and downwardly along the vertical column guideway. Any suitable manual or automatic control means may be provided for effecting stopping of the elevator frame platform at the desired level on the column as for example, control devices on the column actuated by control elements on the elevator frame. Thus, the control may be set to effect stopping of the elevator either manually or automatically at any one of the multiple parking levels on the column. Since such control means do not per se enter into the present invention, further disclosure thereof is herein deemed unnecessary.

Figures 16, 17, 18:
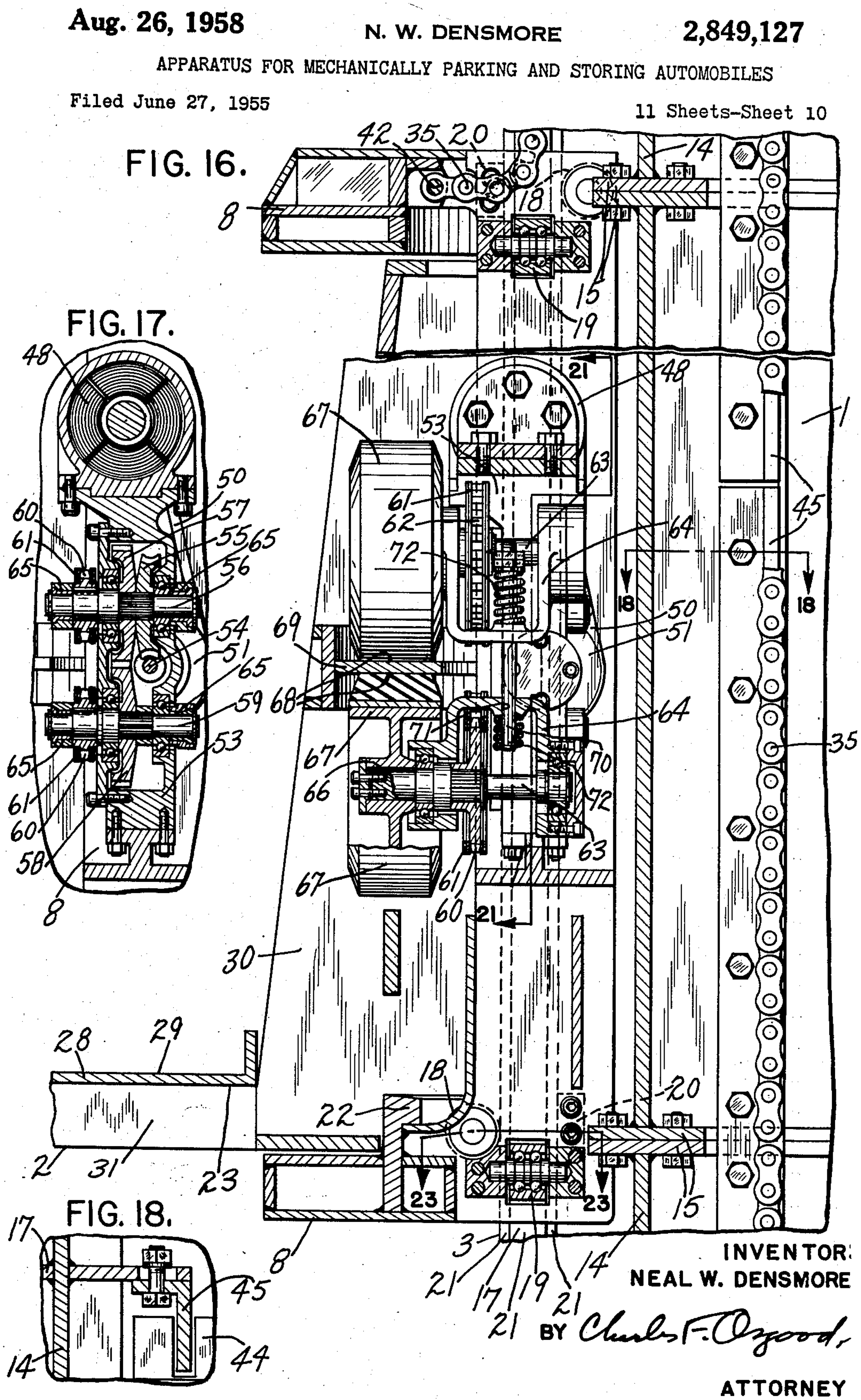
Fig. 16 is an enlarged vertical section taken on line 16—16 of Fig. 14, showing details of the elevator mechanism.
Fig. 17 is an enlarged detail vertical section taken on line 17—17 of Fig. 14.
Fig. 18 is a detail horizontal section taken on line 18—18 of Fig. 16.

The motor driven means for rotating the rotatable platform-supporting frames on the elevator and column may assume various forms but herein comprises a conventional reversible motor 48 mounted on the elevator frame 8 (Figs. 16, 17 and 21) and having its horizontal power shaft carrying a drive pulley 49 connected by endless drive belts 50 to a pulley 51 secured to a horizontal shaft 52 suitably journaled within a gear housing 53 on the elevator frame. Secured to this shaft is a worm 54 meshing with a worm wheel 55 (see also Fig. 17) to drive the latter. This worm wheel has its hub keyed to a horizontal shaft 56 suitably journaled within the gear housing and desirably arranged with its axis of rotation lying in a vertical plane perpendicular to the axis rotation of the shaft 52 (Fig. 21). Also keyed to the shaft 56 is a spur gear 57 meshing with and driving a spur gear 58 keyed to a parallel horizontal shaft 59 likewise suitably journaled within the gear housing 53. Keyed to the parallel shafts 56 and 59 are chain sprockets 60 connected by endless drive chains 61 to sprockets 62 keyed to parallel shafts 63 (Figs. 16 and 21). These shafts 63 are suitably journaled on vertically swingable brackets 64 pivotally mounted, at 65, on bearings supported by the horizontal shafts 56 and 59 and secured to the shafts 63, at 66, are suitable friction drive rollers herein desirably rubber-faced drive rollers or rubber-tired wheels 67 which engage the opposite plane surfaces 68 of the curved horizontal plates 69 of the bodies of the rotatable frames. Parallel vertical bolts 70 (Fig. 21) pass through openings 71 in lugs integral with the swingable brackets 64 and springs 72 surrounding these bolts act on the opposed faces of the bracket lugs yieldingly to urge the brackets to swing inwardly toward one another about their pivots for pressing the rubber-tired wheels firmly against the surfaces of the arcuate plates. Thus, when the motor is operated, the rubber-tired wheels may be driven to turn the rotatable frames along their circular tracks relative to the elevator frame and the column sections.

The column or towerlike pedestal has extending upwardly therethrough a passageway 75 along which a ladder 76 extends so that access to the mechanisms within the column may be obtained. The passageway 75 may be entered through a suitable entrance at the column-base.

Figures 8, 9:
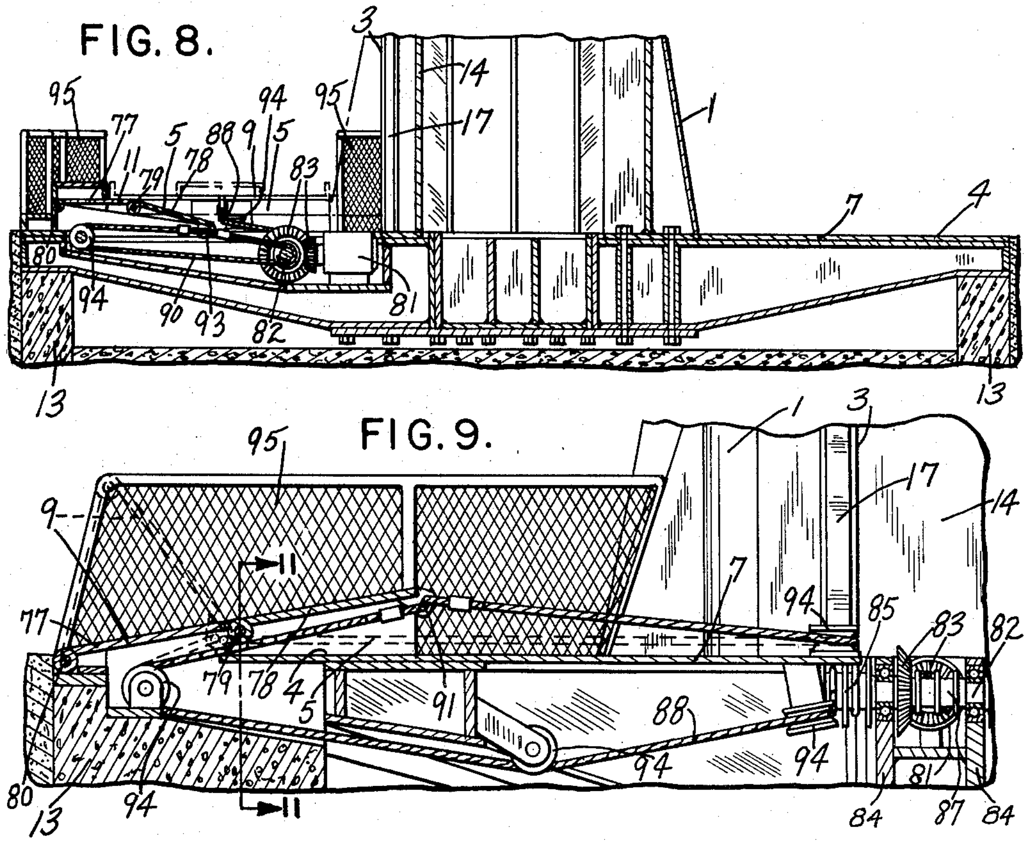
Fig. 8 is a central vertical section taken on line 8—8 of Fig. 5.
Fig. 9 is an enlarged fragmentary sectional view taken on the plane of the structure shown in Fig. 6.
Figure 10:
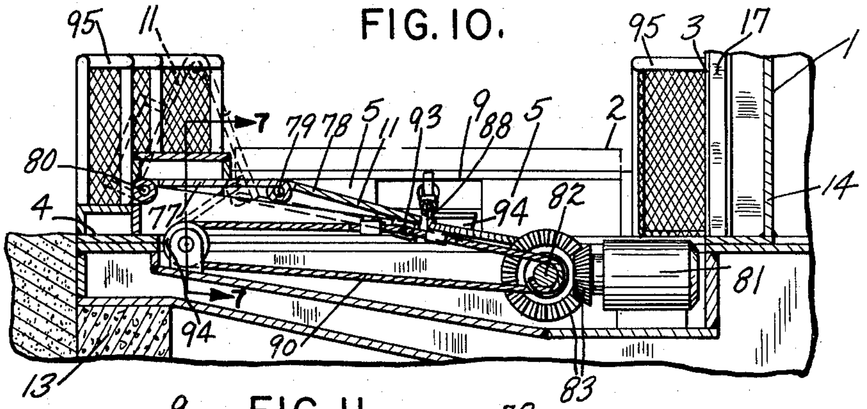
Fig. 10 is an enlarged fragmentary sectional view taken on the plane of Fig. 8.
Figure 11:
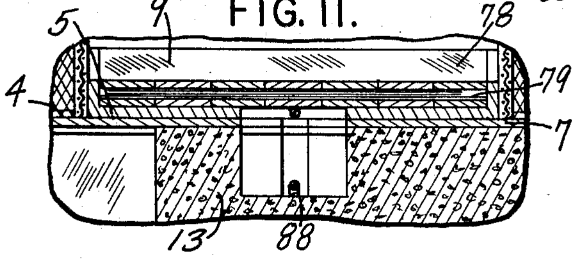
Fig. 11 is a detail vertical section taken on line 11—11 of Fig. 9.

Now referring to the operating means for the several gates 9, 10 and 11, it will be noted that each gate consists of articulated plates 77 and 78 hinged together, at 79, at their adjacent edges and the inner plate is pivotally supported, at 80, at its lower edge on the tower base. When the folded-up, articulated plates are swung upwardly they serve as gates and when they are swung downwardly into a common inclined plane, as shown in Fig. 9, they provide ramps over which the automobiles and the occupants of the automobiles to be parked may pass. The motor operated means for swinging the articulated plates of these combined gates and ramps may assume various forms but herein comprise a conventional reversible motor 81 carried by the tower base and operatively connected to a transverse horizontal shaft 82 through intermeshing bevel gearing 83. The shaft 82 is suitably journaled on bearing brackets 84 on the base frame and secured to this shaft are three double cable drums 85, 86 and 87 on which pairs of cables or ropes 88, 89 and 90 are respectively wound. The cables on each of the double drums are wound in relatively opposite directions so that when the drum is driven one cable is wound in while the other is payed out. The ends of the pair of cables 88 are attached, at 91, to the outer plate of the automobile entrance gate 9, while the opposite ends of the pair of cables 89 are attached, at 92, to the outer plate of the automobile exit gate 10. The opposite ends of the pair of cables 90 are attached, at 93, to the outer plate of the passenger gate 11. Suitably arranged guide sheaves 94 serve to guide the several cables with respect to their respective winding drums. The motor 81 may be provided with suitable manual or automatic controls so that the gates may be raised or lowered and the motor 81 is automatically stopped when the gates are either in their raised or lowered positions. The base of the column in the vicinity of the gates is enclosed by suitable barriers 95, such as fencing, to protect those nearby from possible danger and to keep out unauthorized persons.

The controls for the various movements of the apparatus during parking of an automobile and during removal of a parked automobile from the apparatus may assume any conventional form and may be in the form of a push-button control, a coin controlled mechanism may be electric with electronic controls, or in the form of controls which are mechanically or fluid actuated. Thus, attendants may be reduced to a minimum or, under certain circumstances, may be completely dispensed with.

Figures 5, 6:
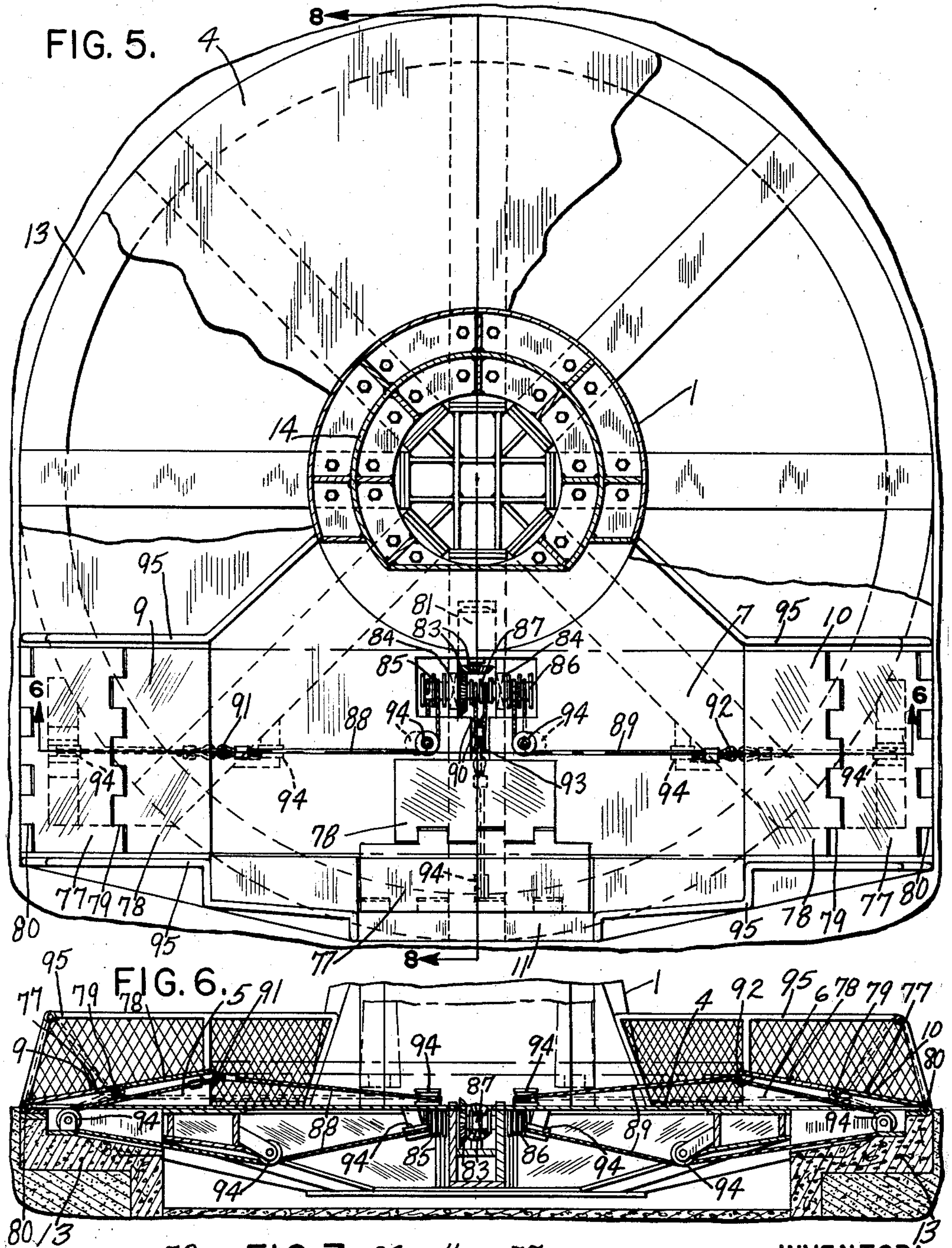
Fig. 5 is a horizontal section taken on line 5—5 of Fig. 4, with the entrance and exit gates open.
Fig. 6 is a vertical section taken on line 6—6 of Fig. 5, and showing the gate-actuating means.
Figure 7:
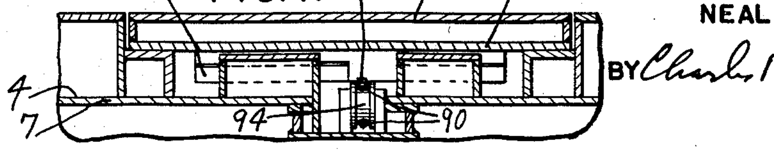
Fig. 7 is a detail vertical section taken on line 7—7 of Fig. 10.

The general mode of operation of the improved automobile parking and storing apparatus will be clearly apparent from the description given. The fenced-in gates of the apparatus are normally closed and when it is desired to admit an automobile to or to discharge an automobile from the apparatus the gates may be lowered by power and when lowered, provide the ramps over which the automobile or its occupants may pass, and the gates and fencing reduce the possibility of injury to those in the vicinity of the apparatus and keep out unauthorized persons. When the platform on the lowered elevator frame is in position just above the base surface 7, as shown in plan in Fig. 3 and in dotted lines in Figs. 6 and 8, an automobile may be driven through the entry over the ramp provided by the front entrance gate onto the platform. The elevator may then be operated to bring the automobile supporting platform to the desired level on the column with the platform at the same level as any of those on the superimposed sections of the column and the rotating mechanism may then be operated to turn the platform on the elevator so that it may roll onto an arcuate track on the column, and a platform may be shoved by the power operated platform frame onto the track of the elevator. Thus, by bringing the elevator to the several parking levels of the column, the column platforms may be progressively completely filled with parked automobiles. Conversely, in a reverse manner the parked automobiles may be progressively removed from the superimposed column platforms and lowered by the elevator platform to the column base where they may be removed from the elevator platform over the exit ramp provided by the lowered exit gate. The operator or occupants of the automobiles may move to and from the automobile on the lowered elevator platform through the intermediate passenger gate.

As a result of this invention, an improved mechanical automobile parking and storing apparatus is provided which is relatively simple, rugged and compact in design and which may be manufactured, operated and maintained at relatively low cost. By the provision of a series of superimposed automobile-receiving platforms supported by a column or mastlike pedestal, together with the associated elevator means, the automobiles may not only be quickly parked but are also readily accessible for removal from the apparatus. The improved apparatus, due to its fabricated built-up construction, may be readily dismantled for transport to a different location, yet is extremely rigid in structure when assembled for use. By the provision of the series of superimposed rotatable automobile supporting platforms mounted to turn about a common vertical axis, together with the associated elevator means, a large number of automobiles may be parked in a minimum of space without the need for frequent repositioning of the automobiles and for lateral shifting of the elevator, and with a minimum of attention. Other advantages will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In an automobile parking and storing apparatus, a centrally located upright mastlike structure, a series of superimposed automobile supports disposed exteriorly of said mastlike structure and spaced vertically at different levels along said mastlike structure for support solely by said mastlike structure, an elevator supported by and movable vertically along said mastlike structure, a guide on said elevator for an automobile support, and guides on said mastlike structure disposed at said different levels whereby an automobile support may be transferred from said elevator guide to a guide on said mastlike structure and vice versa at any level.

2. An apparatus as set forth in claim 1 wherein said automobile supports each comprise a radial armlike portion and parallel guides for the wheels of an automobile to be supported on said armlike portion with said guides arranged at right angles to said armlike portion.

3. An apparatus as set forth in claim 1 wherein said mastlike structure comprises a single upright mast member having superimposed cylindric portions each providing a guide which is curved and said automobile supports each having an arcuate guide engaging portion.

4. An apparatus as set forth in claim 3 wherein said guide on said elevator is also curved and disposable in registry with a curved guide of any one of said superimposed cylindric portions of said mast member.

5. An apparatus as set forth in claim 1 wherein motor operated moving means is carried by said elevator and is operable at any of said levels for moving said automobile supports along said guides of said elevator and said mastlike structure.

6. An apparatus as set forth in claim 5 wherein said supports on said guides of said mastlike structure are shoved along their guides by the support on said elevator guide, said support on said elevator guide abutting the adjacent support on said guide of said mastlike structure.

7. An apparatus as set forth in claim 1 wherein said elevator carries a power device for moving an automobile suport from said elevator guide at any of aforesaid levels, and said support as it is moved from said elevator guide shoving the supports along the adjacent guides of said mastlike structure.

8. An apparatus as set forth in claim 1 wherein said automobile supports have arcuate tracks disposed in registry and said elevator carries a rotary power driven device engaging the track of said support on said elevator guide for moving said support from said elevator guide.

9. An apparatus as set forth in claim 1 wherein means is provided for releasably attaching an automobile support to said elevator whereby a support at any level may be raised or lowered by said elevator.

10. In an automobile parking and storing apparatus, a centrally located column, a series of arcuate guideways disposed in superimposed relation at different levels along said column, an elevator supported by and movable vertically along one side of said column and having an arcuate guide disposable at each level in registry with a guide on said column, an automobile support carried by said elevator guide, and means for transferring said automobile support from said elevator guide to an adjacent guide on said column at any level on said column.

11. An automobile parking and storing apparatus as set forth in claim 10 wherein said guides on said column and said elevator are struck on radii extending from the vertical axial line of said column.

12. An automobile parking and storing apparatus as set forth in claim 10 wherein a plurality of individual automobile supports are receivable from said elevator by said column guides at any of said different levels.

References Cited in the file of this patent

UNITED STATES PATENTS

| | | |
|---|---|---|
| 1,528,893 | Rother | Mar. 10, 1925 |
| 1,554,584 | Lake | Sept. 22, 1925 |
| 1,568,384 | Pungs | Jan. 5, 1926 |
| 1,605,220 | Cuvillier et al. | Nov. 2, 1926 |
| 1,861,461 | Traube | June 7, 1932 |
| 2,403,014 | Nampa | July 2, 1946 |
| 2,702,953 | Heinrich | Mar. 1, 1955 |

FOREIGN PATENTS

| | | |
|---|---|---|
| 426,954 | Great Britain | Apr. 10, 1935 |